April 13, 1965     D. N. YATES     3,177,765
POLARIZING ATTACHMENT FOR ANIMATION PROJECTION
Filed Jan. 17, 1962     3 Sheets-Sheet 1
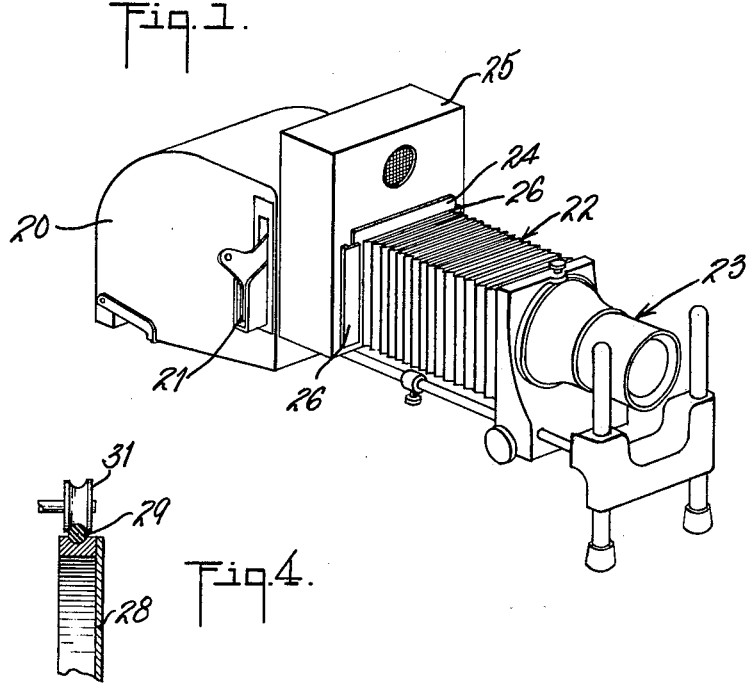
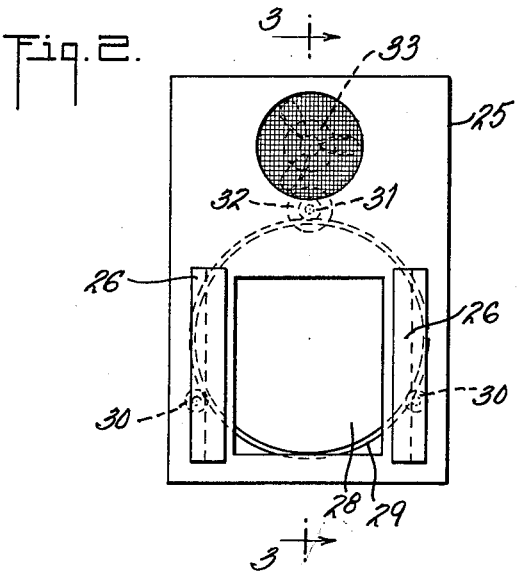
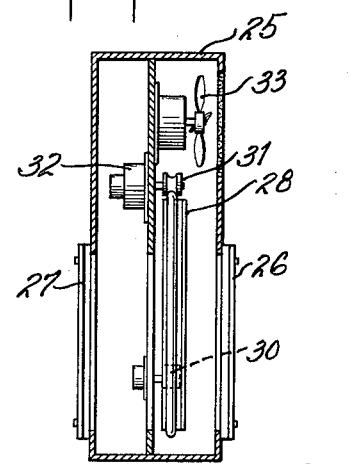
INVENTOR.
DONALD N. YATES
BY
ATTORNEY

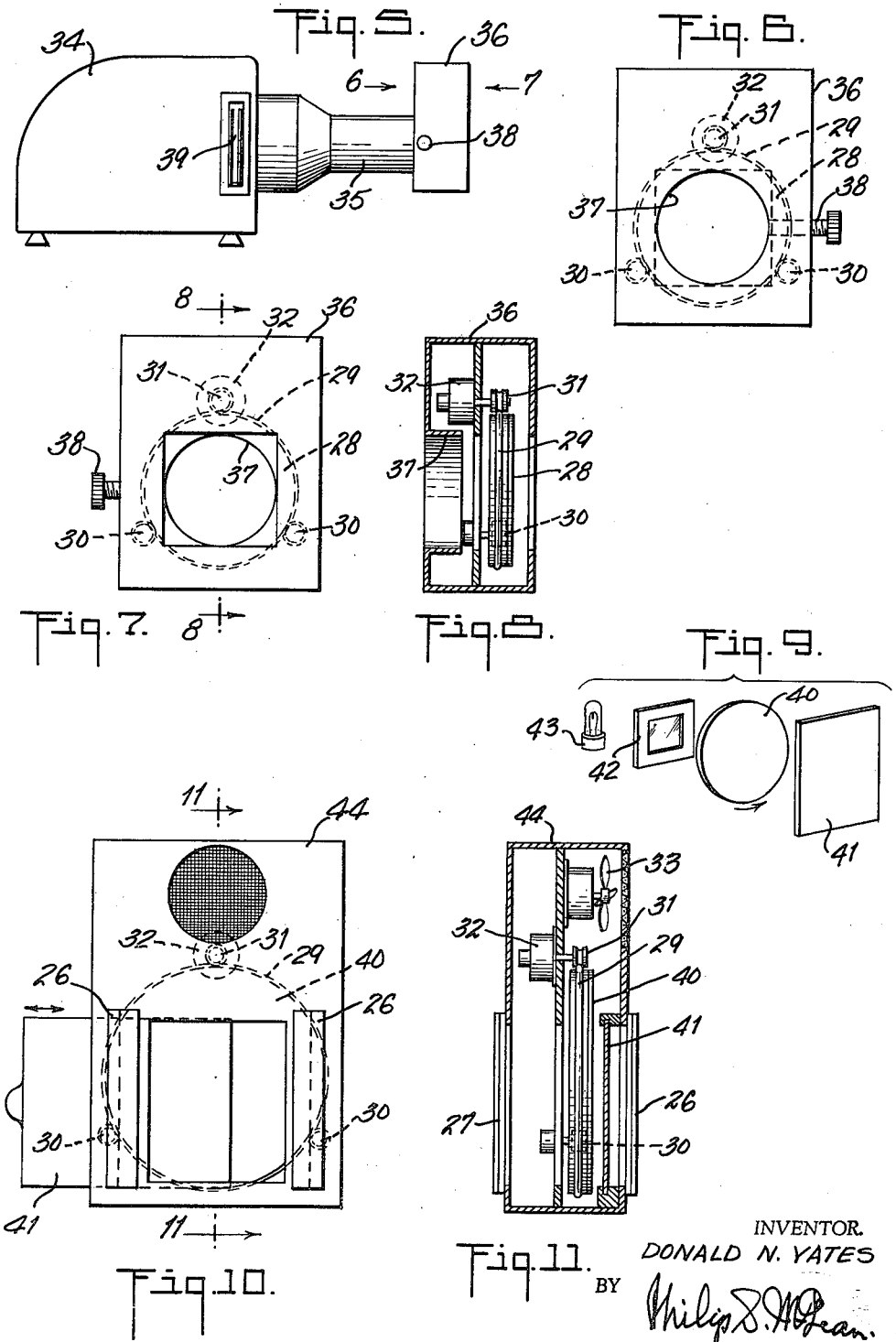

April 13, 1965 D. N. YATES 3,177,765
POLARIZING ATTACHMENT FOR ANIMATION PROJECTION
iled Jan. 17, 1962 3 Sheets-Sheet 3
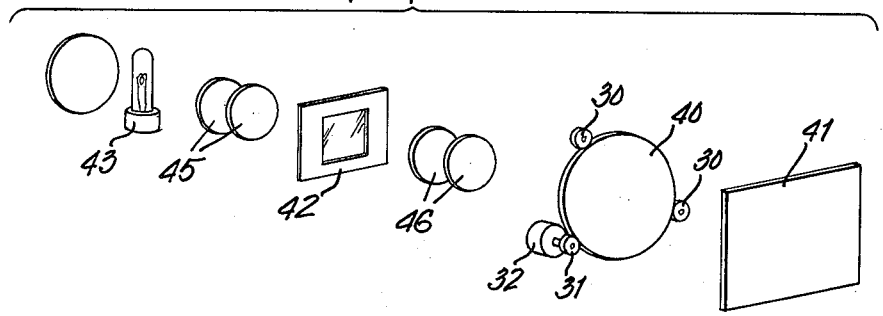
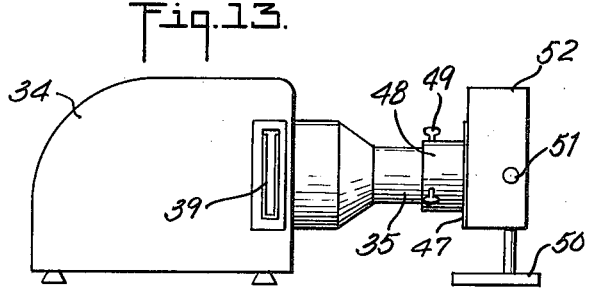
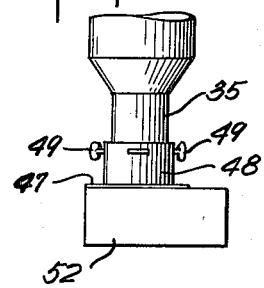
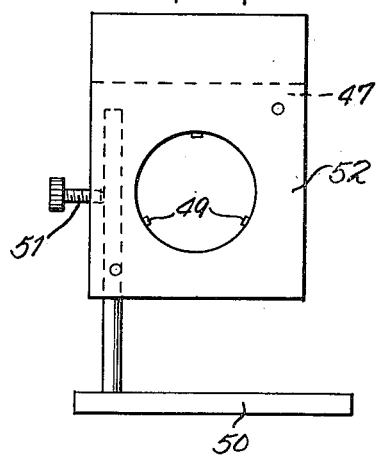
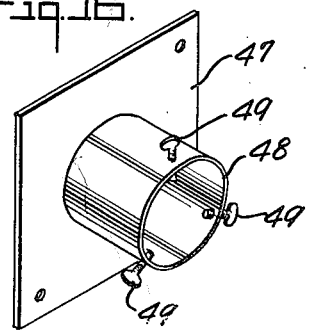
INVENTOR.
DONALD N. YATES
BY
*Philip S. McLean*
ATTORNEY

United States Patent Office 3,177,765
Patented Apr. 13, 1965

3,177,765
POLARIZING ATTACHMENT FOR ANIMATION PROJECTION
Donald N. Yates, 710 Rockwood Drive, Gibsonia, Pa.
Filed Jan. 17, 1962, Ser. No. 168,307
3 Claims. (Cl. 88—24)

The invention disclosed herein relates to the illustration or display of animation, objects or materials in motion, particularly as effected in copending patent application Serial No. 858,395, filed December 9, 1959, now Patent 3,054,204 of September 18, 1962, and wherein action is depicted by a combination of rotary linear polarizer with stationary sequentially angular polarizing segments outlining the display characters or picturization.

Special objects of the present invention are to effect the projection of such animated display onto a screen or the like and to accomplish this with relatively simple apparatus which can be combined with an ordinary slide projector of more or less standard design.

Other special objects of the invention are to simplify and improve the polarizing mechanism, so as to stand the effect of enlargement accomplished by the projector.

Other important objects of the invention are to reduce the size of the polarizing portions of the apparatus to scale this part of the system down to the size of a conventional slide projector.

Further special objects of the invention are to provide the polarizer in the form or forms of an adapter or adapters which may be combined in different ways with projectors as may be required.

The invention thus has been made universally adaptable to various forms of projectors, as will appear hereinafter.

Other novel features of the invention are set forth and will appear in the course of the following specification.

The drawings accompanying and forming part of the specification illustrate several different embodiments of the invention. Structure however may be further modified and changed, all within the true intent and scope of the invention as hereinafter defined and claimed.

FIG. 1 in the drawings is a perspective view of an embodiment of the invention in which the polarizing unit is in the form of an adapter interposed between the bellows and the light system of a conventional slide projector.

FIG. 2 is a front elevation of the adapter with broken lines indicating the novel form of driving the polarizing disc by the rim.

FIG. 3 is a vertical sectional view on substantially the plane of line 3—3 of FIG. 2, showing the rim drive structure and the elements on the front and the back of this unit for coupling it respectively to the bellows and to the lamp housing.

FIG. 4 is an enlarged broken sectional detail of the friction drive from the motor to the disc.

FIG. 5 is a side elevation of a different form of projector and with a form of polarizer mounted as an attachment over the end of the lens tube.

FIGS. 6 and 7 are back and front views of the polarizer looking in the direction of the arrows 6 and 7 in FIG. 5.

FIG. 8 is a vertical sectional view on substantially the plane of line 8—8 of FIG. 7.

FIG. 9 is a diagrammatic view illustrating a modification in which the rotating polarizing disk is replaced by a rotating disk of half-wave material cooperating with a stationary sheet of polarized material. With this combination the motion cycle is doubled so that the gearmotor r.p.m. can be reduced to one-half r.p.m. of that used with the original polarizing disk, enabling use of a smaller gearmotor, with slower, smoother disk operation. In this case the half-wave disk rotates between the animated slide and the polarizer.

FIG. 10 is a front elevation and
FIG. 11 is a vertical sectional view on line 11—11 of FIG. 10 showing a half-wave polarizer in which the stationary polarizer is in the form of a panel which can be withdrawn or inserted to convert the projector from animated to still projection or vice versa.

FIG. 12 is a diagrammatic view illustrating a form of the adapter which may be used with any projector because it is located in front of the lens of the projector. This view shows how the light through the condensing lens passes through the animated slide and thence through the optical lens, rotating half-wave disk and stationary polarizer.

FIG. 13 is a side elevation of such a polarizer applied over the front of the projector.

FIG. 14 is a broken front elevation showing this polarizing unit applied to an overhead projector.

FIG. 15 is a front elevation showing particularly the adjustable stand for the adapter.

FIG. 16 is a perspective view of the adjustable fitting for securing the adapter over the front of the projector.

In FIG. 1 a slide projector of more or less conventional design is shown embodying the usual lamp housing 20, slide carrier 21, bellows 22 and lens system 23.

The bellows has fittings 24 which can be slidingly coupled to companion fittings, not shown on the front of the lamphouse.

Projected animation is effected in this illustration by insertion of an animating slide in the slide carrier 21 and by the interposition of a polarizing adapter in the line of projection between the lamphousing and bellows.

This adapter is shown as a casing 25 having fittings 26 on the front of the same which can be slidingly coupled to the companion fittings on the back of the bellows and reverse fittings 27 on the back of the same which can be engaged with the companion slide fittings on the front of the lamphousing.

By such means the projector can be quickly converted from still to animated projection.

The animating slide may be like the polarized screens disclosed in the companion patent application referred to, made up in the form of a slide to fit in the slide carrier of the projector and composed of art work transparency with a polarizing transparency consisting of angularly displaced polarizing segments. This polarizing slide when substituted for an ordinary still slide will, with the interposed adapter, convert the projector from still to animated projection.

The adapter contains the rotary linearly polarizing disk and motor for driving the same.

The size of these parts is kept down to match the size of the projector by eliminating the center drive of the disk shown in the companion patent application and by supporting and driving this polarizing disk at the perimeter.

FIGS. 2, 3, and 4 illustrate this feature, showing the polarizing disk 28 as having an elastic rim 29 riding on grooved supporting rollers 30 and engaged at the top by the grooved pulley 31 of the gearmotor 32.

This provides a smooth, quiet running drive which keeps the polarizing disk accurately lined up, an important feature in the polarizing action.

A separately operated cooling fan 33 is shown provided within the adapter case.

FIGS. 5 to 8 show how the invention may be combined with a slide projector 34 of the type having no bellows and which is accomplished by building the adapter in a form to go over the lens tube 35 of such a projector.

In these views the casing 36 of the adapter is made with a built in sleeve 37 to fit over the lens tube 35 where it may be firmly held by the clamp screw 38, this casing containing the rim driven rotary polarizing disk as in the construction first disclosed.

With polarizing transparencies inserted in the slide carrier 39, this projector, with the polarizing adapter 36 in place, will project desired animated subjects.

In the modification illustrated in FIG. 9 the rotary linearly polarized disk is replaced by a disk 40 of one-half wave material in back of a stationary linearly polarized panel 41.

With an animated transparency 42 in place between the light source 43 and the revolving half-wave disk the subject matter will be projected in animated form.

This combination has the effect of doubling the motion cycle so that the revolutions can be reduced one-half as compared with the first described polarized disk. This promotes quiet accurate operation with slower, smoother motion and enables use of a smaller gearmotor, all features of advantage in this projector operation.

FIGS. 10 and 11 illustrate one of these half-wave polarizers suitable for use with a conventional slide projector, such as shown in FIG. 1.

A special feature of this particular polarizing unit 44 is that the stationary polarizer 41 is in the form of a panel which, as shown in FIG. 10, may be withdrawn to change from animated to still projection.

This is possible because the one-half wave material is clear, with very little light loss. Thus by removing the polarizing panel the projector is ready for use with unanimated slides.

This removable polarizer panel thus makes it possible to stop or start projected animation instantly, the half-wave disk because of the small light loss remaining in continuous operation.

FIGS. 12 and 13 illustrate another form of half-wave polarizing adapter 52 which, by being mounted in front of the lens, may be used with any standard projector, including the overhead type shown in FIG. 14.

FIG. 12 shows the animating slide 42 as in the slide carrier between the condensing lens 45 and optical lens 46 of the projector, with the half-wave revolving disk 40 in front of the lens system and in back of the stationary polarizer 41.

This polarizing unit may be made up like that shown in FIGS. 10 and 11 and is so designated.

For convenience of mounting, a special fitting is provided consisting, as shown in FIG. 16, of a plate 47 attached to the back of the unit and carrying a projecting sleeve 48 engageable over the lens tube of the projector where it is held properly centered by clamp screw 49.

Additionally there is provided in this form a stand 50 for supporting the unit at the proper level and which stand may be secured in desired adjustment by thumb screw 51.

All forms of the invention provide simple and practical means for quickly converting a slide projector to an animated display projector and vice versa.

The animating transparencies can be made up in the form of slides usable in the slide carriers of ordinary still projectors and the polarizers can be made up in the form of units which can be quickly connected in the optical systems of such projectors.

The rim drive of the disk eliminates need for shafting and pulleys and reduces the overall size and weight of parts.

The reinforcement afforded by the rim drive, FIGS. 3, 8 and 11, enables the disk to be made so thin that surfaces on opposite sides are for all practical purposes parallel, thus eliminating prismatic effects which occur when necessarily thicker film is used and where the two surfaces are not exactly parallel. It is recognized that most transparent sheets do not have truly parallel sides so that disks made of such sheets cause the projected image to oscillate on the screen with rotation of such disks.

The half-wave disk form of polarizing unit assures smooth quiet operation with small compact motor drive.

Another important feature of the rotating half-wave filter in conjunction with the stationary filter, FIG. 9, is that with this combination there is no rotating polarized light projected from the adapter to the screen.

There is thus in such case no pulstaing action such as may exist in the case of a rotating polarized disk.

What is claimed is:

1. A polarizing attachment for projectors comprising a casing provided with means for effecting the mounting of the same in the axis of the light beam projected by a slide projector and whereby said attachment may be applied to and used with an ordinary slide projector and said slide projector be made to project animated subjects on a screen,
an animated artwork transparency outlined by polarizing segments mounted on the optical axis of the projector with which the attachment is used,
a rotary disc of half wave material mounted in said attachment casing in front of said animated artwork transparency,
a motor within said casing for effecting the rotation of said half wave disc, and
a sheet of linearly polarizing material mounted in stationary relation on said casing in front of said rotary half wave disc.

2. The invention according to claim 1 in which said animated artwork transparency is in the form of a slide and in which a slide carrier is present for the removable support of said artwork slide and whereby the attachment may be used with the projector for either animated projection or for still projection according to whether a polarizing artwork slide is in place in the slide carrier or the artwork slide is removed enabling placement of a still slide in the slide carrier.

3. The invention according to claim 1 in which said half wave disc is supported on rollers in engagement with the rim of the disc and holding the disc rotating in a single plane and in which said motor is arranged to drive one of said rollers.

References Cited by the Examiner

UNITED STATES PATENTS

| | | | |
|---|---|---|---|
| 1,885,642 | 11/32 | Strong | 88—65 |
| 2,158,129 | 5/39 | Land | 88—26 |
| 2,165,974 | 7/39 | Land | 88—65 X |
| 2,268,338 | 12/41 | Kober et al. | 88—16.6 |
| 2,276,392 | 3/42 | Headley | 88—26 |
| 2,393,968 | 2/46 | Burchell et al. | 88—65 |
| 2,603,129 | 7/52 | Dreyer | 88—65 |
| 2,977,845 | 4/61 | Boone | 88—65 |

NORTON ANSHER, *Primary Examiner.*

EMIL G. ANDERSON, WILLIAM MISIEK, *Examiners.*